United States Patent [19]

Susnjara

[11] Patent Number: 5,494,088
[45] Date of Patent: Feb. 27, 1996

[54] LOW PROFILE TOOL ASSEMBLY

[75] Inventor: Kenneth J. Susnjara, Santa Claus, Ind.

[73] Assignee: Thermwood Corporation, Dale, Ind.

[21] Appl. No.: 279,193

[22] Filed: Jul. 22, 1994

[51] Int. Cl.$^6$ .............................. B27C 3/00; F16H 37/06
[52] U.S. Cl. ........................ 144/93 R; 74/22 A; 74/63;
74/665 GB; 74/665 S; 144/2 R; 144/365;
144/134 R; 408/25; 408/124
[58] Field of Search ................... 74/16, 22 A, 63,
74/384, 385, 665 GA, 665 GB, 665 GC,
665 S, 665 D; 408/22, 25, 35, 36, 124,
126; 144/1 R, 2 R, 3 R, 93 R, 365, 134 R

[56] References Cited

U.S. PATENT DOCUMENTS

| | | | |
|---|---|---|---|
| 3,518,901 | 7/1970 | Wright | 144/93 R |
| 3,733,662 | 5/1973 | Plevyak | 408/126 |
| 4,478,264 | 10/1984 | Miller | 144/83 |
| 4,810,916 | 3/1989 | McBride | 408/22 |

*Primary Examiner*—W. Donald Bray
*Attorney, Agent, or Firm*—Lalos & Keegan

[57] ABSTRACT

An assembly mountable on a toolhead assembly of a machine tool for performing a work function on a shallow wall of a workpiece positioned on a worktable of the machine generally consisting of a body mountable on the toolhead assembly, having a bottom surface adapted to be positioned adjacent the work table and an elongated bore disposed adjacent the bottom surface, a spindle shaft journaled in the elongated bore, having a bevel gear disposed on an inner portion thereof and means for mounting a tool bit on an outer end portion thereof, and a drive shaft journaled in the body, mountable on a drive spindle of the toolhead assembly and having a bevel gear meshing with the first mentioned bevel gear.

19 Claims, 2 Drawing Sheets

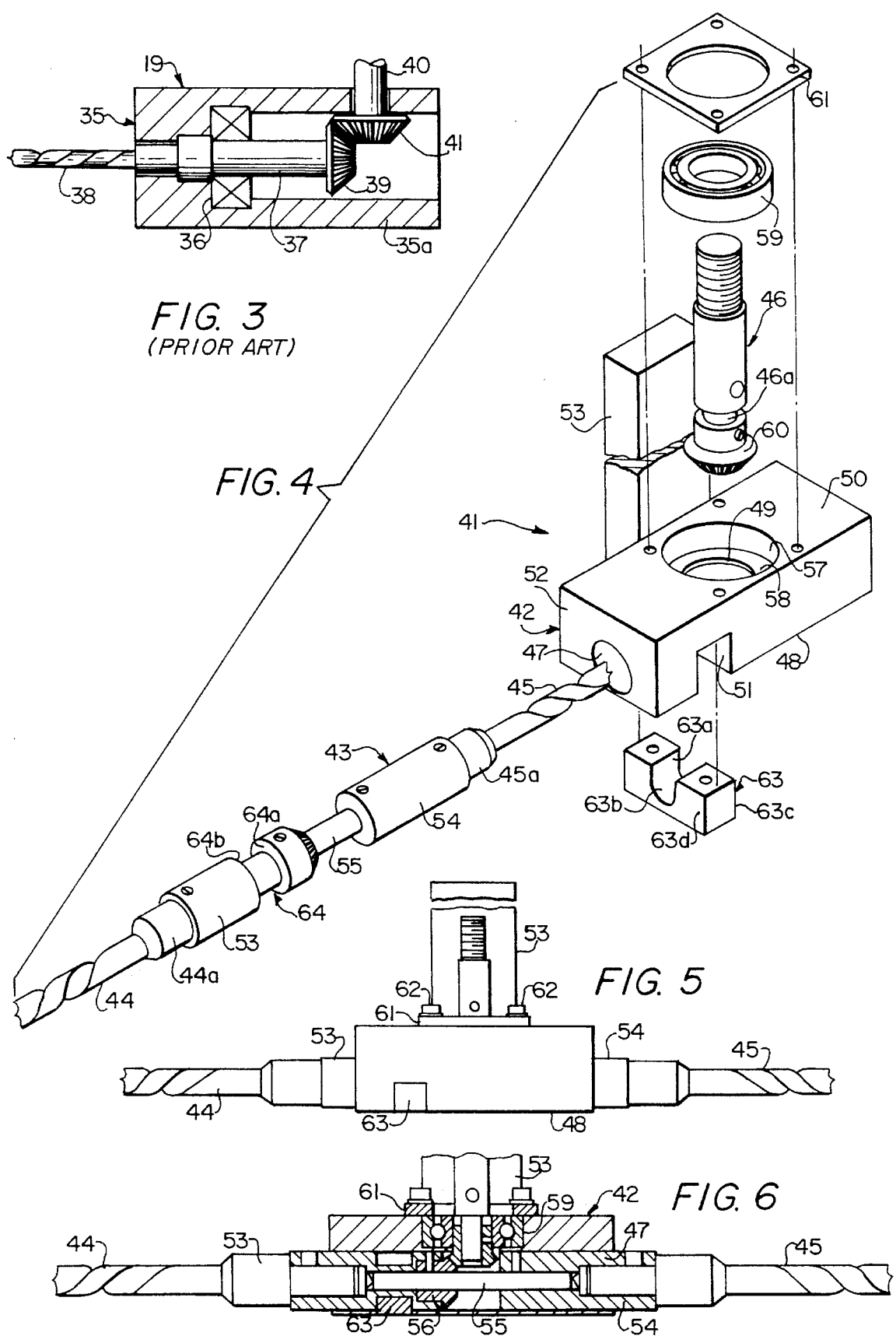

LOW PROFILE TOOL ASSEMBLY

BACKGROUND OF THE INVENTION

This invention relates to machine tools and more particularly to a tool assembly for performing a work function on a shallow side wall of a workpiece such as a wood panel used in the manufacture of furniture, cabinetry and the like.

In the woodworking and other industries, it often is desired to bore horizontal holes in shallow workpieces such as panels used in the manufacture of furniture, cabinetry and the like. Typically, such boring operations are performed on machine tools generally including a worktable upon which the workpiece is positioned, a toolhead assembly provided with a horizontally disposed drill bit which is adapted to the maneuvered by the machine to bore a horizontal hole in a shallow side surface of the workpiece. Because of the shallow thicknesses of such panels and the construction of conventional drill assemblies, it has been necessary to elevate the workpieces on the worktable of the machine to provide sufficient clearance to accommodate the drill assemblies.

Generally, such drill assemblies have been provided with a housing adapted to the mounted on the toolhead assembly, one or more solid or ball bearings mounted in the housing and a drive spindle journaled in such bearings. Such drive spindles usually have been provided with a bevel gear which meshes with a similar gear mounted on a driven shaft also journaled in the housing and operably connected to a drillhead assembly. The use of either a solid or ball bearing for the spindle shaft requires the displacement of the axis of such shaft at such a distance from the bottom surface of the housing in which the shaft is mounted that it is not possible to bore holes in a workpiece mounted directly on the work table, thus necessitating the elevation of the workpiece by use of spacer panels placed under the workpiece.

The requirement of having to elevate such workpieces has been found to be undesirable in that it not only requires the use of spacer panels to elevate the workpieces but further increases the setup time of the machine, correspondingly increasing the cycle times of the machining operation.

Accordingly, it is the principal object of the present invention to provide an improved tool assembly for machine tools.

Another object of the invention is to provide an improved tool assembly for machine tools adapted to perform work functions on a side surface of a shallow panel member.

A further object of the present invention is to provide an improved tool assembly for a machine tool adapted to perform a work function such as boring a hole or routing a slot on a side surface of a shallow panel member mounted on a worktable of the machine tool without having to elevate the panel member in order to accommodate the tool assembly.

A still further object of the present invention is to provide an improved tool assembly for a machine tool adapted to perform work functions on an end or side wall of a shallow panel member mounted directly on a worktable of the machine tool.

Another object of the present invention is to provide an improved tool assembly for a machine tool adapted to perform a work function on an end or side wall surface of a shallow workpiece mountable on a worktable of the machine tool which requires a minimum amount of setup time.

Another object of the present invention is to provide an improved assembly for a machine tool adapted to perform a work function such as drilling, reaming or counter sinking a hole or routing a groove or a slot in an end or side wall surface of a shallow panel member mounted directly on a worktable of the machine tool which is comparatively simple in design, relatively easy and inexpensive to manufacture and highly effective in performance.

Other objects and advantages of the present invention will become more apparent to those person having ordinary skill in the art to which the present invention pertains from the following description taken in conjunction with the accompanying drawings wherein:

BRIEF DESCRIPTION OF THE DRAWINGS

FIG. 3 is a vertical cross-sectional view of a prior art drill assembly used with the type of machine shown in FIG. 2 for drilling the holes for the dowels pins shown in FIG. 1;

FIG. 4 is a perspective view of the drill assembly shown mounted on the machine tool illustrated in FIG. 2, illustrating the components in exploded relation; and FIG. 5 is a side view of the drill assembly shown in FIG. 4;

FIG. 6 is a vertical cross-section of the drill assembly shown in FIGS. 4 and 5.

DETAILED DESCRIPTION

Figure 1:
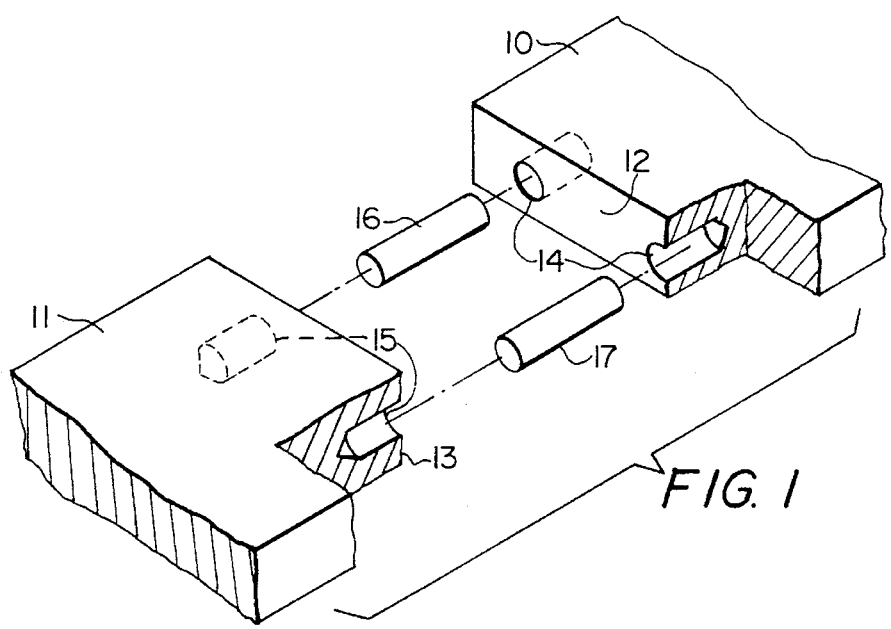
FIG. 1 is a perspective view of a pair of shallow panel members adapted to be joined together by a pair of dowel pins, illustrating the components in exploded relations.

Referring to FIG. 1 of the drawings, there is shown a pair of shallow panel members 10 and 11 having mating surfaces 12 and 13 provided with sets of registered holes 14 and 15 adapted to receive a pair of dowels pins 16 and 17 to align and secure the panel members together in end to end relation. In the prior art, the dowel pin holes in the end or side wall surfaces of such panel members typically where drilled on a computer controlled machine tool 18 as shown in FIG. 2 by means of a drill assembly 19 as shown in FIG. 3.

Figure 2:
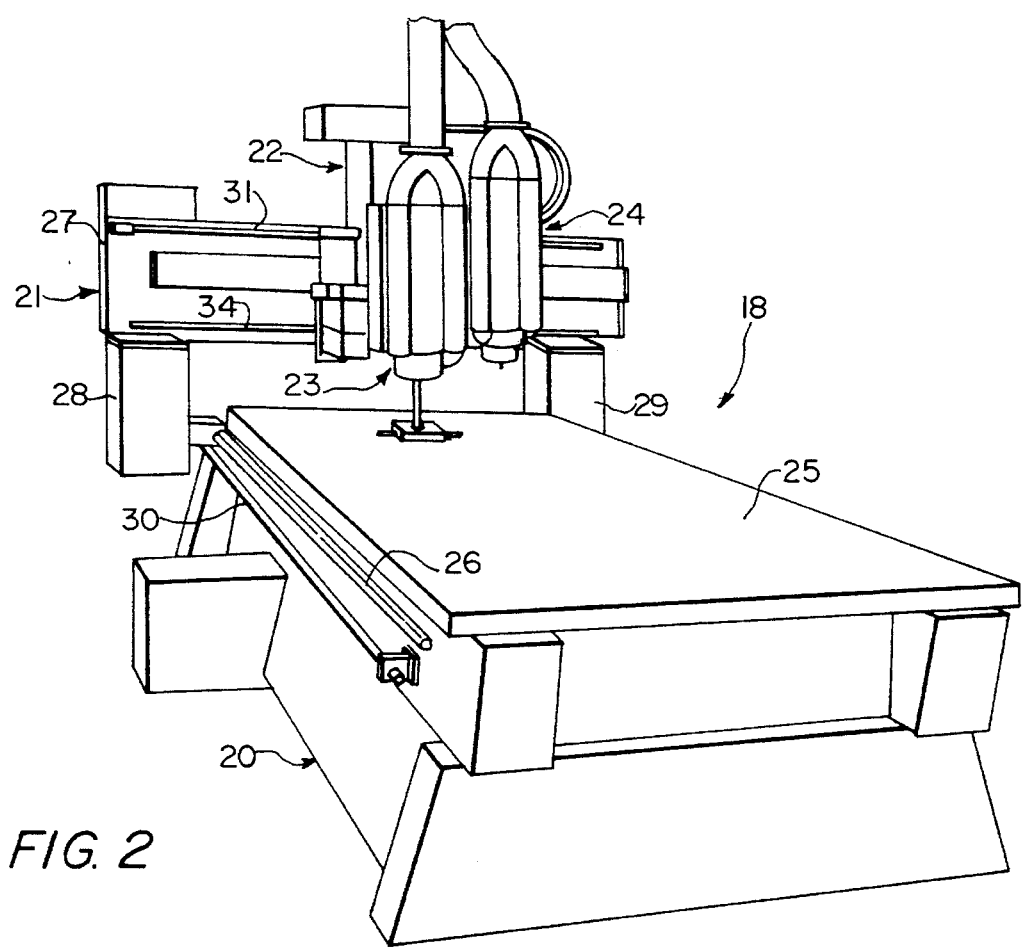
FIG. 2 is a perspective view of a computer controlled machine tool provided with a drill assembly for drilling the holes in shallow panel members as shown in FIG. 1, which embodies the present invention.

Generally, the machine tool shown in FIG. 2 is provided with a controller for displacing the tool assembly thereof along a longitudinal line of travel or x-axis, a transverse line of travel or y-axis and a vertical line of travel or z-axis, in accordance with a program imputed or loaded into the controller for performing a work function on one or more workpieces positioned on the machine. The machine includes a base member 20, a bridge member 21, a toolhead support assembly 22 and a pair of toolhead assemblies 23 and 24. The base member is provided with a worktable 25 mounted on the base member, and a pair of trackways 26, 26 mounted on the sides of the base member and disposed parallel to the x-axis of the machine. Worktable 25 is adapted to support one or move workpieces such as shallow panel members 10 and 11 to be machined. Such workpieces are adapted to be positioned by positioning pins or other means, and secured in position by clamps, a vacuum holddown system or any other means.

The bridge member includes a transversely disposed beam section 27 spaced above and spanning the base member, and a pair of transversely spaced, depending leg sections 28 and 29 flanking the sides of the base member and mounted on trackways 26, 26 for displacement relative to the base member along the x-axis. The bridge member is displaced relative to the base member along the x-axis by means of a pair of drive screw assemblies 30, 30 operatively interconnecting the side portions of the base member and inner side portions of leg sections 28 and 29.

Toolhead support assembly 22 is mounted on and guided along a pair of transversely disposed, vertically spaced trackways 31 and 34 provided on a front face of transverse beam section 27, and is displaceable along the y-axis by a drive screw assembly operatively interconnecting the bridge member and the toolhead support assembly. Each of the toolhead assemblies is supported on and displaceable along transversely spaced, vertically disposed trackways mounted on support assembly 22, and is adapted to be displaced by a drive screw assembly operatively interconnecting the support assembly and a toolhead assembly. Each of the toolhead assemblies further is provided with a tool assembly as shown in FIG. 3 adapted to be displaced along the x, y and z axes to provide a work function on a workpiece such as panel members 10 and 11, positioned on the worktable.

The conventional drill assembly shown in FIG. 3 generally includes a housing 35 mountable on a toolhead assembly 23 or 24, one or more roller bearings 36 seated in the housing, a drive spindle 37 journaled in bearing 36 and having a drill bit 38 mounted on an outer end thereof and a bevel gear 39 mounted on an inner end thereof, and a driven shaft 40 normally journaled in a roller bearing seated in the housing and having an outer end thereof operatively connected to a tool head assembly 23 or 24 and an inner end provided with a bevel gear 41 meshing with bevel gear 39 for transmitting drive from the toolhead assembly to drill bit 38.

In the use of a conventional drill assembly as shown in FIG. 3 to drill a horizontal hole 14 or 15 in a shallow panel member 10 or 11 as shown in FIG. 1, on a machine as shown in FIG. 2, whenever the distance between the axis of a horizontal hole such as hole 14 and a bottom wall of a panel member such as member 10 is less than the distance between the axis of drive spindle 37 and a bottom wall surface 35a of a drill assembly as shown in FIG. 3, it is not possible to drill a horizontal hole in an end or side wall surface of a panel member positioned directly on worktable 25 because of a lack of clearance of the drill assembly. Accordingly, in order to provide for such lack of clearance, it is required to place a spacer panel between the workpiece and table 25 to elevate the workpiece and permit proper alignment of drill bit 38 with the workpiece. Because of the low profile provided by the present invention as shown in FIGS. 4 through 6, the necessity of a spacer panel in the use of the type of assembly shown in FIG. 3 is eliminated.

FIGS. 4 through 6 illustrate a drill assembly 41 generally consisting of a housing 42 mountable on a toolhead assembly 23 or 24, a drive spindle 43 journaled in housing 42 and provided with tool bits 44 and 45, and a drive shaft 46 journaled in housing 42 and operatively connectable to a drive spindle of a toolhead assembly. Housing 42 consists of a block of solid bearing material such as bronze and is provided with a longitudinal bore 47 disposed adjacent a bottom wall 48, an opening 49 in upper wall 50 communicating with longitudinal bore 47 and a transversely disposed, rectangular slot 51 also communicating with horizontal bore 47 between an end wall 52 and opening 49 of the housing block. The housing is supported on a toolhead assembly by means of a depending arm member 53 rigidly secured at its lower end to a side wall of the housing by means of a set of bolts and similarly connected at its upper end to a component of the toolhead assembly.

Drive spindle 43 includes a pair of tubular shaft sections 53 and 54 having the inner ends thereof journaled in horizontal bore 47 and spaced apart by means of a reduced shaft section 55 received within the inner ends thereof and secured thereto by a pair of set screws. The outer ends of spindle sections 53 and 54 are provided with enlarged openings for receiving shank portions 44a and 45a of drill bits 44 and 45 therein which also are retained therein by a pair of set screws. As best shown in FIG. 6, reduced shaft section 55 extends through opening 49 and is provided with a bevel gear 56 mounted thereon having the base portion thereof received in an enlarged section of tubular shaft section 53 and secured thereto by means of a set screw. The outer diameter of bevel gear 56 is no greater than the outer diameter of shaft section 53 so that the gear is disposed on an inner face of shaft section 53 and within the cylindrical confines of the spindle shaft.

Opening 49 in upper wall 50 of the housing is enlarged as shown at 57 to provide a bearing seat 58 on which there is seated a ball bearing 59. Drive shaft 46 is provided with a reduced lower end section 46a on which there is mounted and secured by means of a set screw, a bevel gear 60 journaled in the inner race of bearing 59 and meshing with bevel gear 56 for transmitting drive from drive shaft 46 to spindle shaft 43. Bearing 59 is retained in place by a retainer plate 61 secured to upper surface 50 of the housing block by means of a set of bolts 62 and which is provided with an opening for receiving shaft 46 therethrough.

In operation, the radial load of the drill assembly is carried by means of the engagement of spindle shaft sections 53 and 54 with the substantial area of the cylindrical wall surface of elongated bore 47. The thrust or axial load of the assembly is carried by means of a retainer member 63 received within slot 51 of the housing block, cooperating with a reduced section 64 of spindle shaft section 53 and secured to the housing block by means of a pair of bolts extending through openings in the retainer member and threaded into registered openings in the housing block. As best shown in FIGS. 4 and 6, the retainer member is provided with a slot 63a in a top wall surface thereof, having a width corresponding to the diameter of reduced spindle shaft portion 64 and a lower semi-cylindrical surface 63b having a radius corresponding to reduced portion 64. When the retainer member is inserted in the housing block, in the assembled condition as shown in FIGS. 5 and 6, reduced shaft portion 64 will be received within slot 63a and the inner portions of side wall surfaces 63c and 63d will be disposed in opposed relation to annular surfaces 64a and 64b, respectively, provided by reduced shaft portion 64, to preclude axial movement of the spindle shaft and transmit axial loads to the housing block. In the assembled condition, the side walls of the retainer member will be disposed flush with the side walls of the housing block and the bottom wall of the retainer block will be disposed flush with the bottom wall of the housing block so that the housing block may be positioned adjacent the worktable without any interference.

In assembling the drill assembly as described, bevel gear 56 is first press fit into an inner, enlarged portion of spindle shaft section 53 and secured thereto by means of a set screw, and then intermediate shaft section 55 is press fit into bevel gear 56 and shaft section 53. Shaft section 54 then is press fit on the other end of intermediate shaft section 55 so that the inner face thereof will be spaced from bevel gear 56 by a predetermined amount. To provide accurate spacing of the components, intermediate shaft section 55 may be machined with shoulders against which the various components may abut to provide the proper spacing. With the spindle shaft thus preassembled, it is inserted into the housing block through elongated bore 47 so that bevel gear 56 is positioned to be engaged in meshing relation with bevel gear 60. Next, bevel gear 60 is mounted and secured on reduced lower portion 46a of drive shaft 46, bearing 59 is positioned on shaft 46, resting on bevel gear 60, and the sub-assembly is inserted into opening 49 in the housing block so that ball bearing 59 is received and seated in enlarged section 57 to center the shaft and the teeth of bevel gear 60 mesh with the teeth of bevel gear 56. The sub-assembly is then secured in position by means of retainer plate 61 which receives the drive shaft through the opening thereof and is secured to the housing block by bolts 62. Finally, retainer member 63 is inserted in slot 51 and secured therein and arm member 53 is secured to the housing block. When the assembly is to be used to perhaps perform a drilling operation, drill bits 44 and 45 are inserted into and secured to spindle shaft sections 53 and 54, arm member 53 is secured to the housing of the toolhead assembly and drive shaft 46 is operatively connected to the spindle shaft of the toolhead assembly.

Since the housing block functions not only as a housing but also a bearing for the spindle shaft, the spindle shaft can be located adjacent the bottom surface of the housing block to permit the horizontal drilling of holes in end or side wall surfaces of shallow workpieces mounted directly on the worktable of the machine tool. The elongated bore for the spindle shaft may be located as close as possible to the bottom surface of the housing block consistent with maintaining the structural integrity of the assembly. The placement of the spindle shaft adjacent the bottom surface of the housing block further is permitted by the reduced intermediate section of the spindle shaft providing for the mounting of a beveled gear on such section having an outside diameter no greater than the outside diameter of the spindle shaft. Such construction thus provides for a spindle shaft having the lowest possible profile for performing various work functions such as drilling, reaming, countersinking, chamfering, routing and the like on end side wall surfaces of shallow workpieces such as wood, plastic and non-ferrous metallic panels mounted directly on the worktable of a machine.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An assembly mountable on a toolhead assembly of a machine tool for performing a work function on a shallow wall of a workpiece positioned on a worktable of said machine tool comprising:

a body mountable on said toolhead assembly, having a bottom surface adapted to be positioned adjacent said worktable and a bore disposed adjacent said bottom surface;

a spindle shaft journaled in said bore, having a beveled gear disposed on an inner portion thereof and means for mounting a tool bit on an outer end portion thereof; and a drive shaft journaled in said body, mountable on a drive spindle of said toolhead assembly and having a bevel gear meshing with said first mentioned bevel gear.

2. An assembly according to claim 1 wherein the thickness of the portion of said body disposed between said bore and said bottom surface thereof is no less than required to maintain the structural integrity of said assembly under operating conditions.

3. An assembly according to claim 1 wherein said body is formed of a rigid bearing material.

4. An assembly according to claim 1 wherein said body is formed of a bronze material.

5. An assembly according to claim 1 wherein said spindle shaft is provided with a reduced inner portion and said first mentioned bevel gear is mounted on said reduced portion.

6. An assembly according to claim 5 wherein the outside diameter of said first mentioned bevel gear is no greater than the diameter of said spindle shaft.

7. An assembly according to claim 1 wherein said body includes a thrust bearing.

8. An assembly according to claim 1 wherein said spindle shaft includes a reduced portion and said body includes a section received within said reduced drive shaft portion for carrying thrust loads.

9. An assembly according to claim 1 wherein said body is provided with a recess communicating with said bore and said spindle shaft is provided with a reduced portion registering with said housing recess, and including a retainer member received within said recess and extending into said reduced spindle shaft portion.

10. An assembly according to claim 9 wherein said retainer member includes a recess portion receiving said reduced spindle shaft portion, providing a pair of leg portions engageable with annular end walls of said reduced spindle shaft portion.

11. An assembly according to claim 1 wherein said spindle shaft is provided with a reduced section disposed within said body having a beveled gear disposed on said reduced section and means for mounting tool bits on outer end portions thereof.

12. An assembly according to claim 11 wherein the thickness of the portion of said body disposed between said bore and said bottom surface thereof is no less than required to maintain the structural integrity of said assembly under operating conditions.

13. An assembly according to claim 11 wherein said body is formed of a rigid bearing material.

14. An assembly according to claim 11 wherein said body is formed of a bronze material.

15. An assembly according to claim 11 wherein the outside diameter of said first mentioned bevel gear is no greater than the diameter of said spindle shaft.

16. An assembly according to claim 11 wherein said body includes a thrust bearing.

17. An assembly according to claim 11 wherein said spindle shaft includes a second reduced section and said body includes a section received within said second reduced spindle shaft section.

18. An assembly according to claim 11 wherein said body is provided with a recess communicating with said bore and said spindle shaft is provided with a second reduced section registered with said recess, and including a retainer member received within said recess and extending into said reduced drive shaft section for carrying thrust loads.

19. An assembly according to claim 18 wherein said retainer member includes a recessed portion receiving said second reduced spindle shaft section, providing a pair of leg portions engageable with annular end walls of said reduced spindle shaft portion.

\* \* \* \* \*